United States Patent [19]
Sadowsky et al.

[11] Patent Number: 5,940,346
[45] Date of Patent: Aug. 17, 1999

[54] MODULAR ROBOTIC PLATFORM WITH ACOUSTIC NAVIGATION SYSTEM

[75] Inventors: John S. Sadowsky, Mesa; Jami J. Shah, Scottsdale, both of Ariz.

[73] Assignee: Arizona Board of Regents, Tempe, Ariz.

[21] Appl. No.: 08/989,716

[22] Filed: Dec. 12, 1997

Related U.S. Application Data

[60] Provisional application No. 60/032,840, Dec. 13, 1996.

[51] Int. Cl.⁶ ........................................................ G01S 3/80
[52] U.S. Cl. ........................... 367/128; 367/120; 367/124
[58] Field of Search ..................................... 367/120, 128, 367/124, 129; 340/825.54, 825.69

[56] References Cited

U.S. PATENT DOCUMENTS

| 5,491,670 | 2/1996 | Weber ....................................... 367/127 |
| 5,504,477 | 4/1996 | Whitright et al. ....................... 367/120 |

OTHER PUBLICATIONS

H.E. Bass, "Atmospheric Absorption of Sound: Further Developments", J. Acoust. Soc. Am., vol. 97 nl pp. 680–683, Jan. 1995.

O. Cramer, "The Variation of the Specific Heat Ratio and the Speed of Sound in Air with Temperature, Pressure, Humidity, and $CO_2$ Concentration", J. Acoust. Soc. Am., vol. 93 n5 pp. 2510–2515, May 1993.

L.J. Bond, "Absorption of Ultrasonic Waves in Air at High Frequencies (10–20MHz)," J. Acoust. Soc. Am., vol. 92 n4 pl pp. 2006–2014, Oct. 1992.

Seenu S. Reddi, "An Exact Solution to Range Computation with Time Delay Information for Arbitrary Array Geometries," IEEE Trans. Acoust., Speech, Signal Processing, vol. 41 nl pp. 485–486, Jan. 1993.

Thomas A. Herring, "The Global Positioning System," Scientific American, vol. 274 n2 pp. 44–50, Feb. 1996.

C. Maxfield, "The Ouroboros of the Digital Consciousness: Linear–Feedback–Shirt Registers," EDN, vol. 41 nl pp. 135–142, Jan. 1996.

"24–bit Digital Signal Processor Family Manual", pp. 4–1–4–26, Motorola, Inc. 1995.

"24–Bit Digital Signal Processor User's Manual", pp. 1–1–1–6, Motorola, Inc. 1996.

*Primary Examiner*—Ian J. Lobo
*Attorney, Agent, or Firm*—Baker & Botts, L.L.P.

[57] ABSTRACT

A navigation system and method for identifying a position or navigating an autonomous robotic platform within an area is provided including a moveable device having an acoustic transmitter for transmitting an acoustic signal, an electronic processor device and an RF receiver; and three or more beacons positioned proximate the area, each beacon including a signal receiving apparatus responsive to the acoustic signal and an RF transmitter, the acoustic signal and the RF signal received from each of the beacons being processed in the electronic processor device to identify the location of the platform within the area.

19 Claims, 12 Drawing Sheets

Microfiche Appendix Included
(1 Microfiche, 27 Pages)

MODULAR ROBOTIC PLATFORM WITH ACOUSTIC NAVIGATION SYSTEM

SPECIFICATION

This application claims priority under 35 U.S.C. § 119(e) from provisional application No. 60/032,840 filed on Dec. 13, 1996.

The invention was made under contract with an agency of the U.S. Government. The name of the U.S. Government agency and the U.S. Government contract number are NSF and EEC 94 11522.

A Microfiche Appendix containing a computer code listing utilized in practicing this invention is included hereinbelow. The Appendix includes one microfiche with 27 frames.

This invention relates to robotic platforms adaptable to various applications and capable of autonomous navigation. Specifically, the invention relates to the platform's acoustic navigation system.

BACKGROUND OF THE INVENTION

Many implementations of robotic platforms have been developed over the years. Most require human operation and are tethered or wired to a controller. This limits the platform's work area and applicability to particular tasks. A navigation system that allows a mobile robotic platform to operate autonomously in a relatively large work area for varied applications is preferable.

In the prior art, radio frequency (RF) based navigation systems have been utilized, such as the Global Positioning System (GPS). GPS is a system that transmits pseudo-noise (PN) signals from a constellation of orbiting satellites down to earth. Detection of these signals allows an earth-based receiver to determine ranges (distances) to the satellites. In fact, PN ranging is a standard technique in RF based navigation systems.

A problem with using RF based navigation systems involves their level of accuracy. Because the speed of radio propagation is roughly $10^9$ ft/sec, it is difficult to acquire precise range values. For instance, one inch ranging precision in RF based navigation systems requires sub nanosecond timing precision. That type of timing would be very difficult and expensive to incorporate into a navigation system. A GPS system is actually able to place an object within about 10 or 15 yards anywhere on earth. For a robotic application within a bounded area, this degree of accuracy is insufficient.

Alternatively, ultrasound has been used for navigation in various industrial applications. Ultrasonic frequencies are those above 20 kHz. Because high frequency sounds are attenuated rapidly in the air, ultrasound has an effective range of only about fifty feet. Thus, for applications requiring a platform to autonomously travel within an area of 200–300 yards, ultrasound is ineffective.

An object of the present invention is to provide a local area acoustic ranging/positioning system for an independent autonomous robotic platform without any wiring or tethering which results in accuracy greater than systems of the prior art.

An additional object of the invention is to provide a robotic platform that can accommodate a variety of work elements (tools) to adapt to a range of indoor and outdoor applications such as painting parking lots, marking and decorating athletic fields and autonomous surveillance.

SUMMARY OF THE INVENTION

The present invention overcomes the prior art limitations by providing an acoustic ranging system to position and navigate an autonomous mobile robotic platform throughout a work area. The robotic navigation system includes a robotic platform and at least three beacons. The platform includes a drive system, a device for transmitting an acoustic PN signal, a device for receiving an RF signal and a device for processing information from the acoustic PN signal and the RF signal to navigate the platform. Each beacon has a device for receiving the acoustic PN signal transmitted by the platform, a device for processing the acoustic PN signal into an RF signal and a device for transmitting the RF signal to the platform.

This acoustic ranging system uses low frequency audible signals which have a greater range than high frequency sounds and work surprisingly well in the presence of local noise such as that emanating from highway traffic.

BRIEF DESCRIPTION OF THE DRAWING

Further objects, features and advantages of the invention will become apparent from the following detailed description taken in conjunction with the accompanying figures in which.

Figure 1:
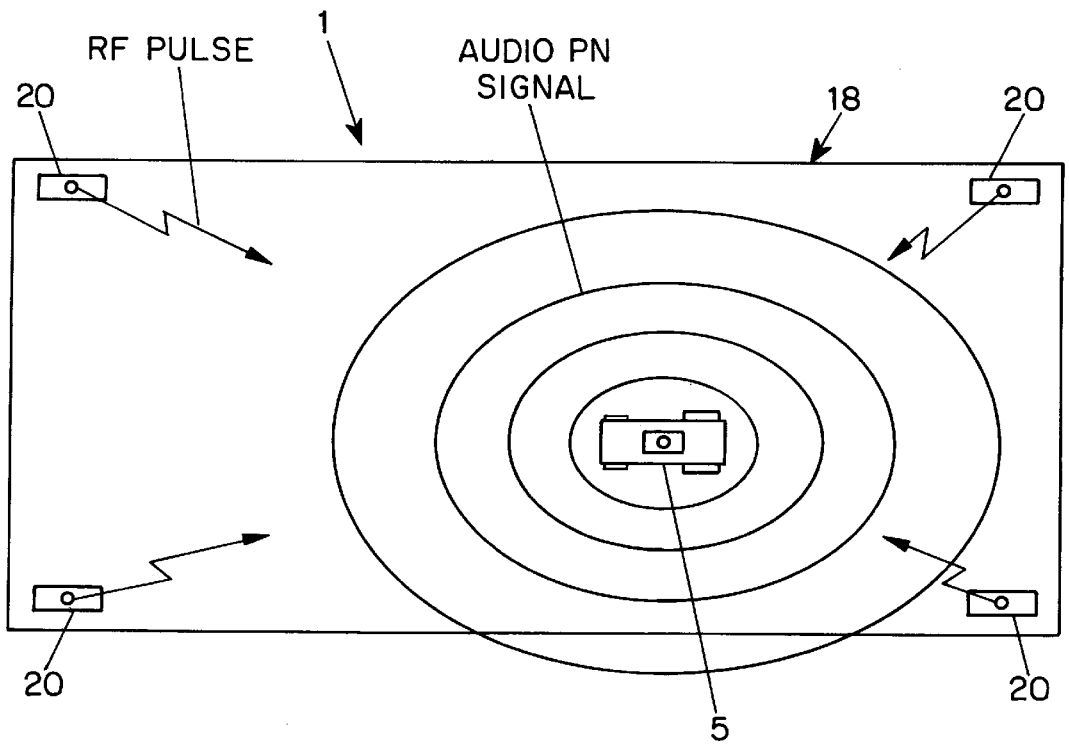
FIG. 1 is an illustration of the robotic navigation system of the present invention.

Throughout the figures, the same reference numerals and characters, unless otherwise stated, are used to denote like features, elements, components or portions of the illustrated embodiment. Moreover, while the subject invention will now be described in detail with reference to the figures, it is done so in connection with preferred embodiments. It is intended that changes and modifications can be made to the described embodiments without departing from the true scope and spirit of the subject invention as defined by the appended claims.

DETAILED DESCRIPTION

The robotic navigation system 1, according to one embodiment of the present invention, is illustrated in FIG. 1.

The system includes a mobile robotic platform 5 and three or more remote receivers 20, called "beacons," situated at the borders of a work area 18 within which the platform travels. Preferably, four beacons 20 are used in the system, as illustrated in FIG. 1.

Platform and Beacons

Figure 2A:
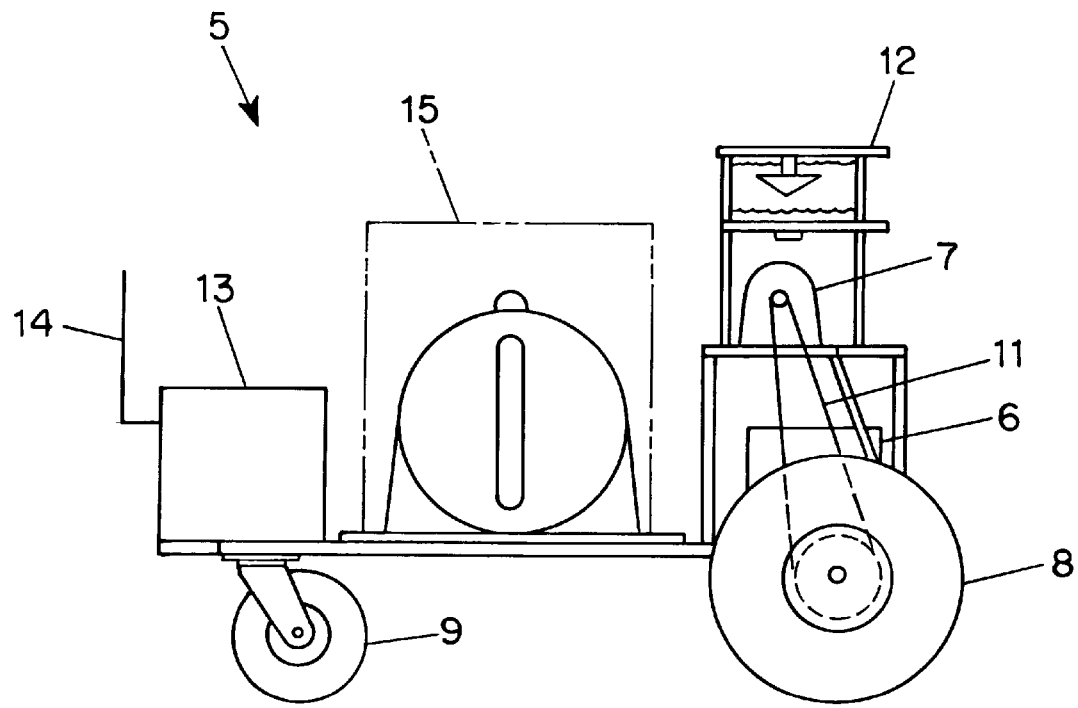
FIGS. 2A and 2B are diagrams of one embodiment of the robotic platform viewed from the side and the rear, respectively.
Figure 2B:
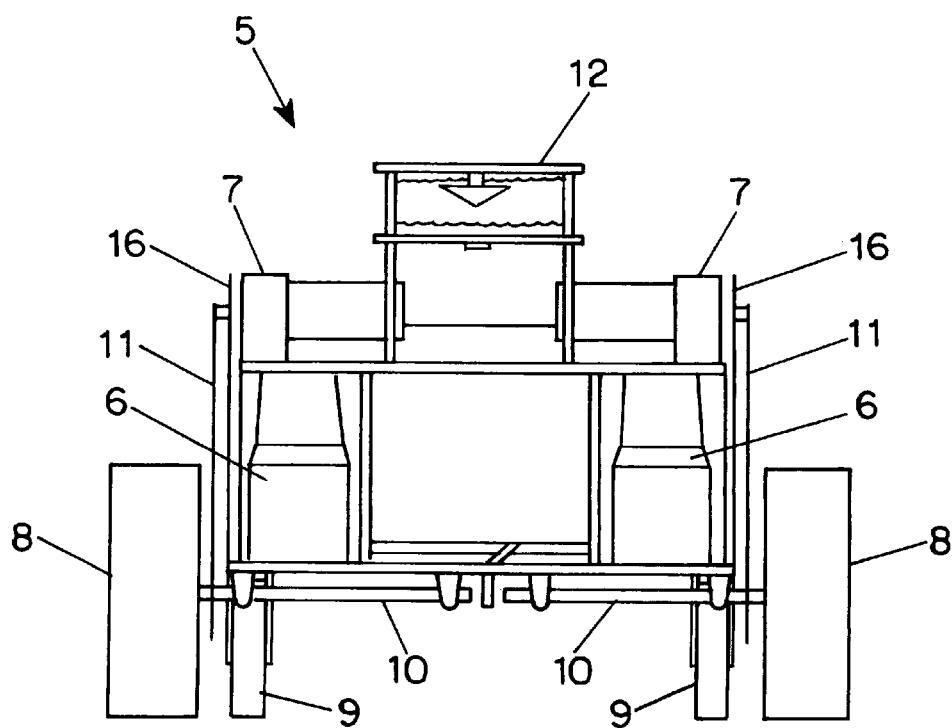

The robotic platform 5 includes, on board, a power source, a drive system, a navigation (hardware/software) subsystem, controllers and a structure with connections for carrying required tools for a given application. One embodiment of the platform is illustrated in FIGS. 2A and 2B. Preferably, the power source includes one or more batteries 6, e.g., two 12 volt Concord gel 34 AL. The drive system preferably incorporates two Bodine ¼ horsepower gear motors 7 with a 10:1 ratio, each mounted above one of two rear wheels 8. Each motor preferably has a coupled speed sensor disk 16. The speed sensor is, preferably, a magnetic Hall effect sensor. Varying the speeds of each motor provides the steering capability of the platform. The rear wheels 8 preferably are 16 inch casters. The two front wheels 9 are not driven and preferably are eight inch casters. Each of the rear wheels 8 has its own drive shaft 10. The drive shafts 10 are preferably made of steel ¾ inch in diameter and 18 inches long. Preferably, two sprocket/chain drives 11 with a 45:1 ratio are used.

The navigation subsystem includes a speaker tower assembly 12 mounted between the two motors with a four inch mid-range speaker and an omni-directional cone reflector. A laptop computer (not shown) is, preferably, mounted on the speaker tower assembly 12 to provide navigation and drive processing capability. An electronics box 13 having an antenna 14 is mounted to the platform to receive and process RF signals sent from the beacons as part of the navigation subsystem and to provide other drive controls.

The platform preferably includes pressure sensors, proximity sensors and a magnetic compass (none shown) to further aid navigation.

Because the platform is general purpose, it can be fitted with various tools to create robotic devices for performing many applications. A payload/tool region 15 of the platform is reserved for mounting the desired tool(s) such as a pressurized liquid spray unit for painting, powder dispensing systems for marking and decorating playing fields and video equipment and robotic manipulators.

Operation of the beacon 20 is controlled by the use of a circuit board with a low cost digital signal processor (DSP). A DSP, such as the Motorola DSP56002 processor, is a special purpose microprocessor that is tailored for numerical signal processing computations, such as those that arise in correlation receivers. Each beacon also includes a microphone, a preamplifier and a radio transmitter. Further discussion of the beacon design is included below.

Operation of Platform

The robotic platform operates in two modes: survey mode and navigation mode. In the survey mode, the platform determines the location of each of the beacons using the on board acoustic ranging system. In the navigation mode, the platform uses the acoustic ranging system to accurately go through the maneuvers required to perform the sequence of tasks stored in the program selected by the user.

In the survey mode, the platform's navigation subsystem transmits an acoustic PN signal (described hereinbelow) that is detected by the beacons. The robot-to-beacon link is called the uplink. Each beacon derives a synchronization ("sync") pulse from the PN signal that "tags" the time-of-arrival of the received signal. This sync pulse is transmitted to the platform's navigation subsystem via an RF link, called the downlink. The RF signal is created in a manner known to those skilled in the art (e.g., pulse modulation). Since the speed of radio propagation is substantial relative to the speed of sound, the total uplink/downlink propagation delay is essentially just the acoustic robot-to-beacon propagation delay. In other words, the radio propagation time is negligible in comparison to the acoustic uplink propagation time. The robotic platform has, at its disposal, data indicative of the time of transmission, as determined by a transmitter sync pulse and the beacon's generated sync pulse that was returned to the platform via the RF downlink. Comparison of these two pulses determines the propagation delay of the acoustic signal, and multiplication by the speed of sound determines the measurement of the range (distance) to the beacon.

Although the navigation system employs several beacons, there is only one acoustic uplink that is transmitted from the platform using the four inch mid-range speaker and the omni-directional cone reflector, as illustrated in FIGS. 1 and 2. Different beacons are identified by the platform by using different RF carrier frequencies for the downlinks. Navigation is performed by measuring the range to three or more known beacon locations. The platform's position coordinates are derived from range measurements by using standard navigation practice techniques known to those skilled in the art.

During the navigation mode, these derived coordinates are compared with the coordinates predicted from a predetermined program in the on-board computer. Any deviation of the platform's coordinates from its programmed position is processed by the computer and the drive system is operated using standard motor control technology known to those skilled in the art to move the platform to its programmed position.

Acoustic PN Signal

As stated above, the robotic platform surveys the work area and its position therein by using an acoustic PN ranging system. Unlike an RF-based navigation system such as GPS that, as described hereinabove, requires sub nanosecond timing precision for one inch ranging precision and actually has a ranging precision of 10 to 15 yards, the speed of sound being roughly $10^3$ ft/sec allows acoustic ranging with one inch precision by determining the time of arrival with timing precision of $10^{-4}$ sec (=$\frac{1}{10}$ msec) Therefore, within an operating range of up to approximately 200–300 yards, navigation precision better than one inch is attainable with use of the acoustic system.

The absorption of acoustic frequencies in air is a complicated function of temperature, pressure, humidity, and frequency. The equation for the absorption coefficient is as follows:

$$\frac{\alpha}{p_s} = \frac{F^2}{p_{s0}} \left\{ 1.84 \times 10^{-11} \left(\frac{T}{T_0}\right)^{1/2} + \left(\frac{T}{T_0}\right)^{-5/2} \left[ \frac{0.01278 \times e^{-2239.1/T}}{F_{r,0} + F^2/F_{r,0}} + 0.1068 \frac{e^{-3352/T}}{F_{r,N} + F^2/F_{r,N}} \right] \right\} \text{Np/m} \cdot \text{atm,}$$

-continued $$\frac{\overline{\alpha}}{p_s} = 8.686 \cdot \frac{F^2}{p_{s0}} \left\{ 1.84 \times 10^{-11} \left(\frac{T}{T_0}\right)^{1/2} + \left(\frac{T}{T_0}\right)^{-5/2} \left[ \frac{0.01278 \times e^{-2239.1/T}}{F_{r,0} + F^2/F_{r,0}} + 0.1068 \frac{e^{-3352/T}}{F_{r,N} + F^2/F_{r,N}} \right] \right\} \, dB/m \cdot atm$$

where $F=f/p_s$, $F_{r,0}=f_{r,0}/P_s$ and $F_{r,N}=f_{r,N}/p_s$, are frequencies scaled by atmospheric pressure ($p_s$) $p_{s0}$ is the reference pressure (1 atm), $T_0=293.15$ K, T is the atmospheric temperature in K, and f is the frequency in Hz. Formulas for the scaled relaxation frequencies for oxygen and nitrogen are:

$$F_{r,0} = \frac{1}{p_{s0}} \left( 24 + 4.04 \times 10^4 h \frac{0.02+h}{0.391+h} \right)$$

and $$F_{r,N} = \frac{1}{p_{s0}} \left(\frac{T_0}{T}\right)^{1/2} \left( 9 + 280h \times \exp\left\{ -4.17 \left[ \left(\frac{T_0}{T}\right)^{1/3} - 1 \right] \right\} \right),$$

respectively, where h is the absolute humidity in %. For completeness the relationship between h and the relative humidity $h_r$ is:

$$h = h_r \frac{p_{sat}/p_{s0}}{p_s/p_{s0}} \%.$$

The equation for $p_{sat}$, the saturation vapor pressure, is $$\log_{10}(p_{sat}/p_{s0}) = 10.79586[1 - (T_{01}/T)] - 5.02808 \log_{10}(T/T_{01}) + 1.50474 \times 10^{-4} \times (1 - 10^{-8.29692[(T/T_{01})-1]}) - 4.2873 \times 10^{-4}(1 - 10^{-4.76955[(T_{01}/T)-1]}) - 2.2195983$$

where $T_{01}=273.16$ K. is the triple-point isotherm temperature, and all other variables are as stated hereinabove. Although any consistent pressure units may be used, expressing the pressure in atm makes the factor $p_{s0}$ unity, and the preceding equations simplify somewhat.

Figure 3:
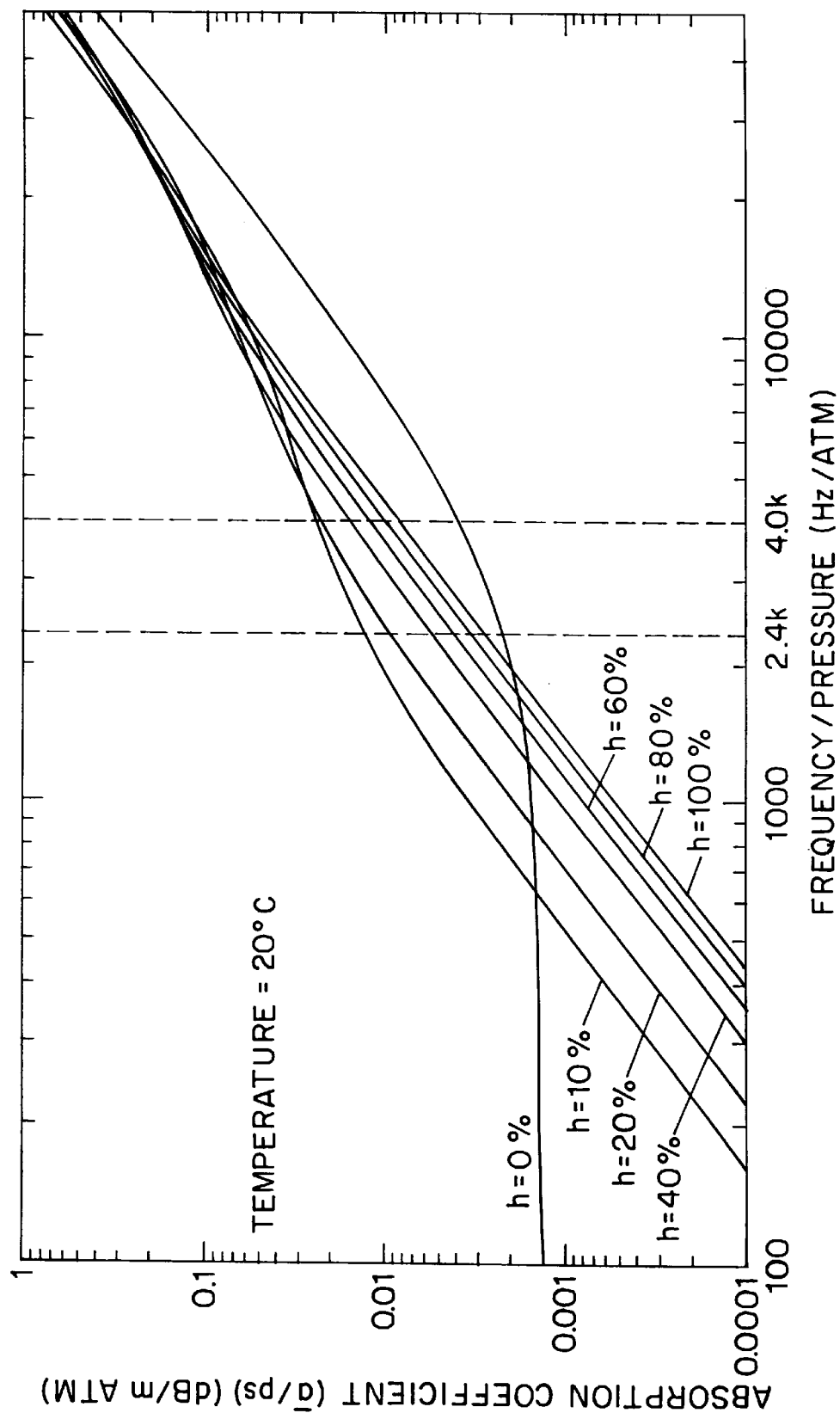
FIGS. 3–5 are charts indicating the sound absorption coefficient plotted against frequency varying humidity and temperature of 20° C. (68° F.), 30° C. (86° F.) and 45° C. (113° F.), respectively.

FIG. 3 shows the dependency of the absorption coefficient, $\overline{\alpha}/p_s$ on frequency and relative humidity at a temperature of 20° C. (68° F.). Because the system is being operated at ranges in the neighborhood of 200 m, an absorption coefficient of 0.05 dB/m results and a 10 dB drop in signal power occurs due to absorption alone. Therefore, the absorption coefficient for the acoustic carrier frequency chosen needs to be below 0.05 dB/m, a value for $\overline{\alpha}/p_s$ that seems reasonable for success in the present invention.

Figure 4:
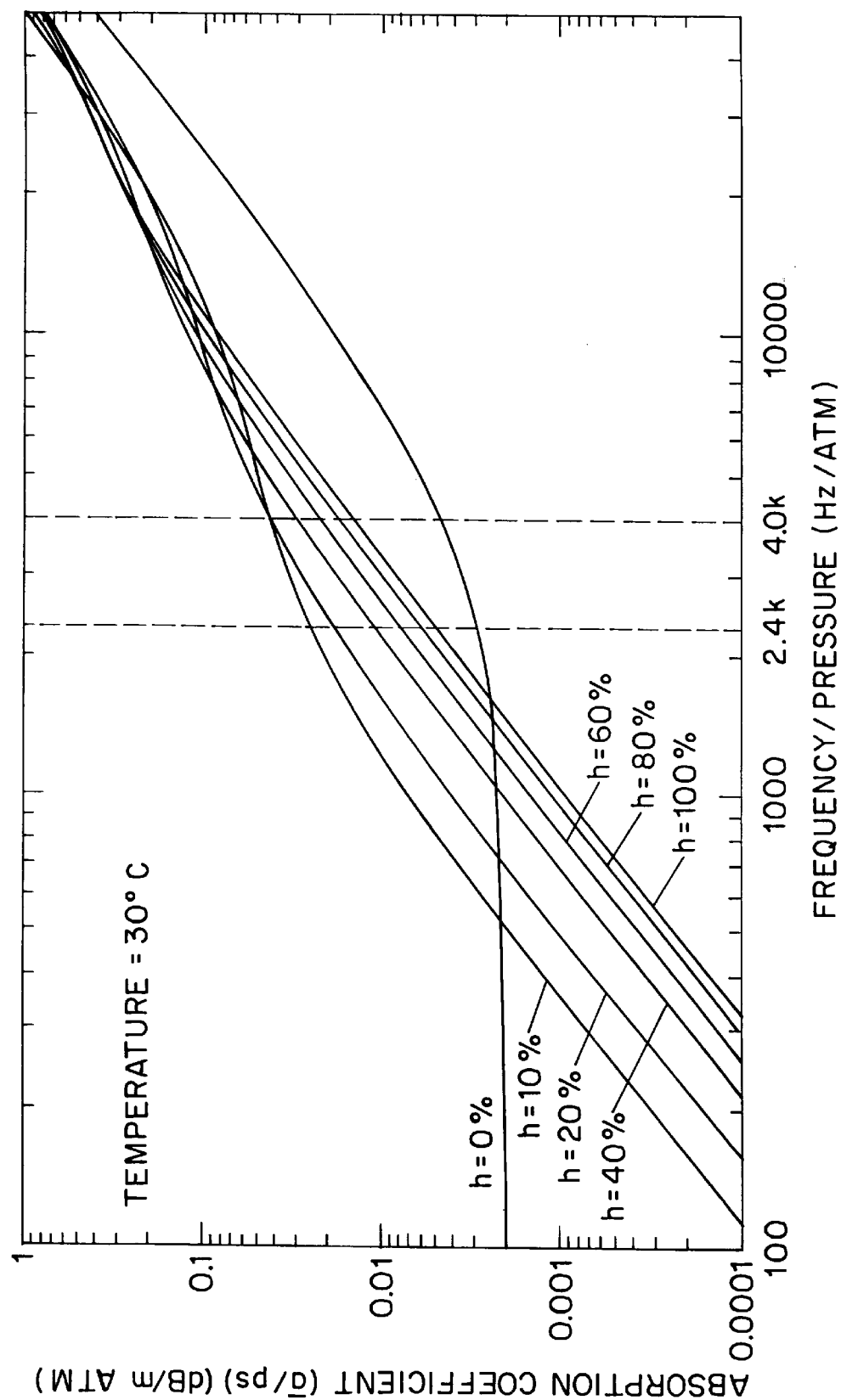
Figure 5:
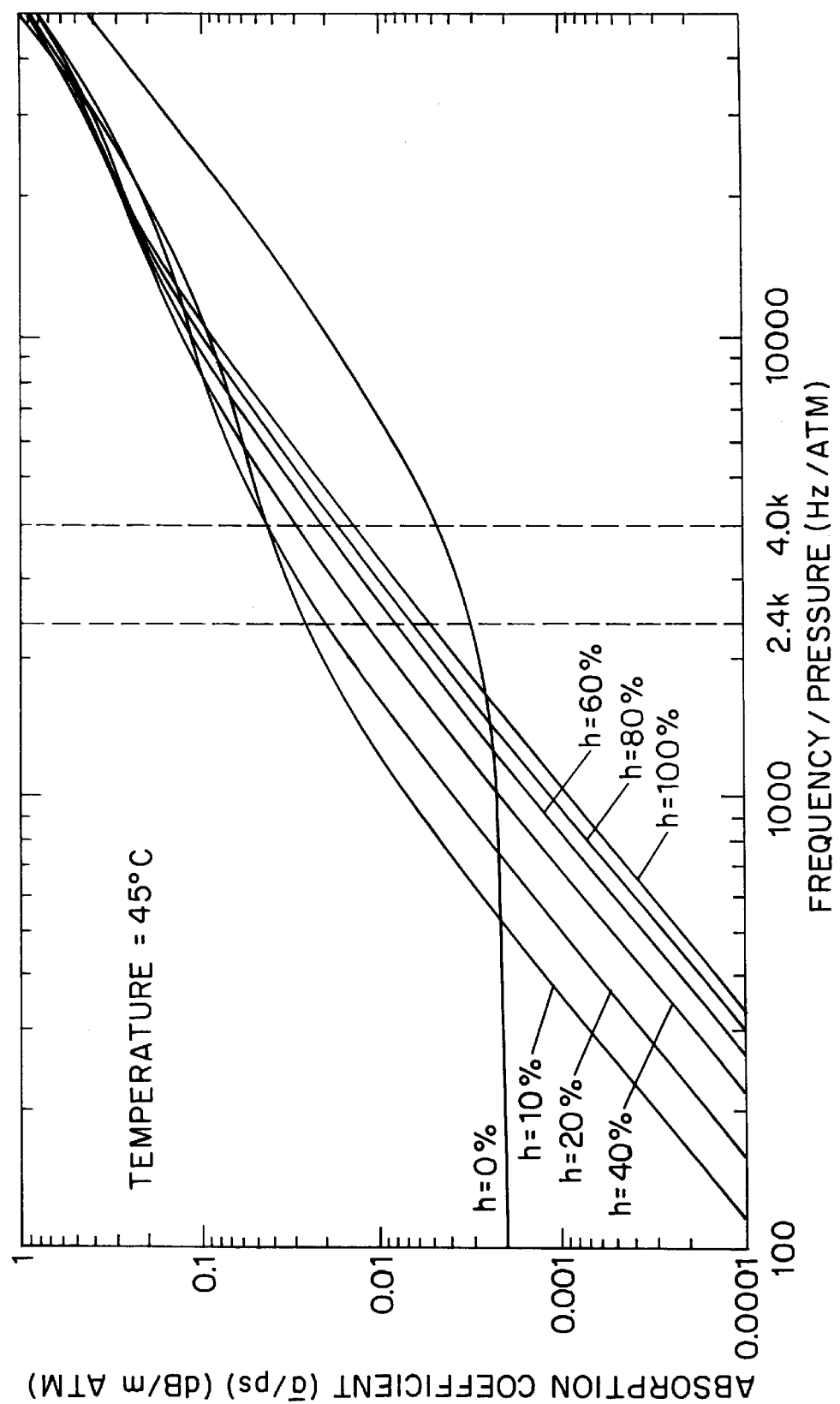

In FIGS. 4 and 5, the absorption coefficient is plotted against frequency for varying humidity and temperatures of 30° C. (86° F.) and 45° C. (113° F.). It can be seen from these figures that the absorption increases with temperature as well as with humidity. Even where the humidity is approximately 10%, and the temperature is 45° C. (112° F.), absorption coefficients of approximately 0.05 dB/m for the carrier frequencies used in the present invention result. This value is close to the maximum tolerable value for the absorption coefficient.

In addition to the absorption power losses, there is a dispersion power loss that increases as a function of the square of the distance from the source ($r^2$). An estimate of the power loss by dispersion comes about by assuming that the constant power transmitted by the speaker is distributed over the surface of a sphere ($4\pi r^2$). A hemispherical model would be more applicable in this case since the radiation pattern is approximately that of a point source over a plane. In this case, the power is distributed over $2\pi r^2$, or one half of the spherical surface. It can be seen that only the constant term is affected by choosing better approximations of the dispersion pattern, the dispersion power loss still increases as a function of $r^2$. Thus, absorption and dispersion should be taken into account when choosing an acoustic carrier frequency.

There are two main reasons for using a PN signal for acoustic ranging in the present invention. First, it is a continuous constant amplitude signal, thus minimizing the peak-to-average power ratio. Minimizing peak acoustic power allows use of cheaper low power acoustic transducers. This also eliminates the potential for hearing damage due to brief bursts of intense acoustic energy that might be associated with a pulse ranging system. The second advantage of the PN signal is its noise and interference rejection. A PN signal is jam resistant. The system is very robust to in band interference such as human speech and road noise.

A PN signal is derived from a periodic binary sequence that has many properties of a totally random binary sequence. The transmitted signal has the form $$x(t)=Ap(t)\cos(2\pi f_c t)$$

where A is the signal amplitude, p(t) is the binary ±1-valued PN signal, and $f_c$ is the carrier frequency. The PN signal itself is of the form $$p(t) = \sum_k u_{(k \bmod n)} r(t - kT_c)$$

where $u_0, \ldots, u_{n-1}$ is the binary ±1-valued PN code of length n and r(t) is a rectangular pulse of length $T_c$ (r(t)=1 for $0 \leq t < T_c$, and r(t)=0 otherwise). The successive pulses in the PN signal are called "chips," and $1/T_c$ is the "chip rate." The PN signal p(t) is periodic of period $T=nT_c$.

Figure 6:
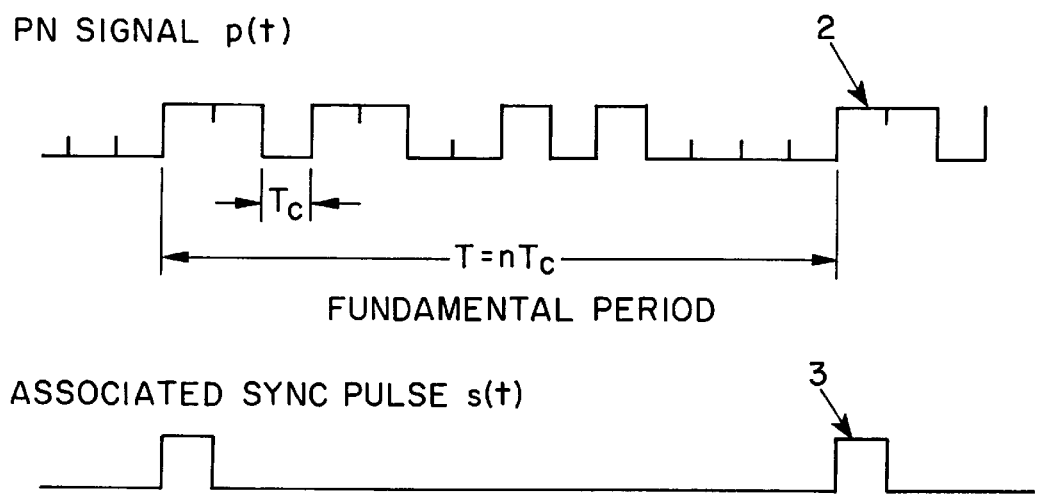
FIG. 6 is an illustration of a PN signal and associated sync pulse according to the invention.

FIG. 6 illustrates a PN signal (p(t)) 2 without the carrier frequency present. This figure also shows how the associated sync pulse (s(t)) 3 marks the first chip of each fundamental period of the PN signal.

Figure 7:
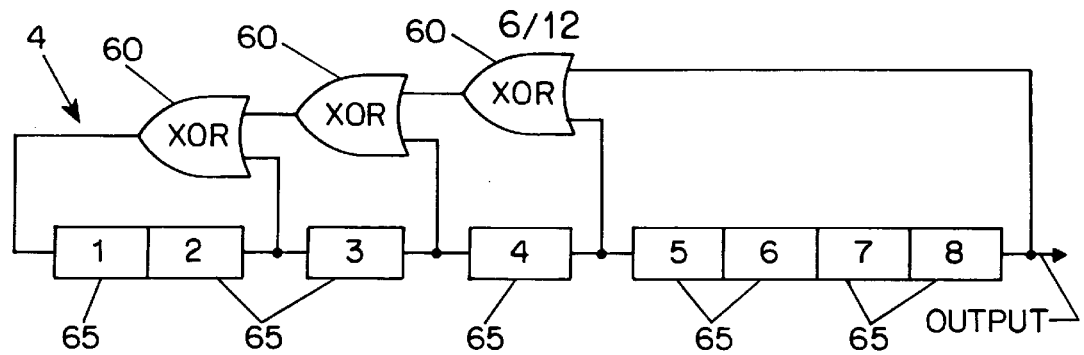
FIG. 7 is a block diagram of a linear feedback register used to construct a PN code sequence according to one embodiment of the invention.

There are standard techniques for constructing the PN code sequence $u_0, \ldots, u_{n-1}$ having the desired statistical properties. The type of sequence used in one embodiment of the present invention is a maximal length linear feedback shift register sequence, often called an m-sequence in the literature. FIG. 7 illustrates the linear feedback register 4 used to construct a binary ±1-valued 255 bit long PN code sequence. This conventional register employs eight shift registers 65 each holding one bit and three XOR gates 60 used to compute the value in the first shift register. Employing an m-sequence with n=255, chip rate $1/T_c$=800 Hz, and acoustic carrier frequency $f_c$=4 kHz results in a PN signal period of T≅318 msec. The particular design parameters are only nominal design values. For example, decreasing $f_c$ may increase the operating range of the system, and increasing the chip rate may increase the accuracy of the system.

In order to simplify the carrier demodulation at the beacon by having sequential samples 90° out of phase with one another, the sampling frequency, $f_s$, must be an integer multiple of four times $f_c$ in order to use a technique known as quarter wave sampling. Because the absorption coefficient must be below 0.05 dB/m, possible carrier frequencies include 1.6 kHz, 2.4 kHz, 3.2 kHz as well as the above-referenced 4 kHz. However, it can be shown that choosing carrier frequencies of 2.4 kHz or 4 kHz greatly simplifies the carrier demodulation scheme at the beacon.

Beacon Processing

Each beacon processes the received signal y(t) x(t−τ) where τ is the uplink propagation delay. The function of the beacon is to reconstruct the delayed sync pulse signal S(t−τ) and transmit it back to the platform on the RF downlink. To do this, the receiver compares y(t) against a locally generated PN signal p(t−$\hat{\tau}$) through a signal processing technique known as cross-correlation. In essence, the receiver adjusts its delay estimate $\hat{\tau}$ to maximize the correlation between the received signal and the locally generated PN signal.

The beacon design is complicated by the fact that robot dynamics introduce a Doppler frequency shift in both the acoustic carrier and the PN signal. This is a marked contrast to RF systems where Doppler shift must be corrected only for carrier tracking. A significant point of contrast is that the signal bandwidth $1/T_c$ is a large fraction of the carrier frequency $f_c$, which is not the case in RF systems. The effect of robot motion is that the propagation delay is itself a function of time: τ=τ(t). During one period of the PN sequence (approximately ⅓ sec) constant velocity motion may be assumed, which yields a delay model of the form τ(t)=τ₀+$\dot{\tau}$(t−t₀). The received signal can then be expressed as $$y(t)\, x(t-\tau(t))=p((1-\dot{\tau})t-\tau_0)\cos(2\pi(f_c+\lambda)t+\phi)$$

where $\lambda=-\dot{\tau}f_c$ is the carrier Doppler frequency shift and $\phi=-2\pi f_c\tau_0$. Thus, vehicle motion results in both a Doppler shift on the carrier frequency and a time compression (or expansion) on the PN modulation. In order to perform accurate PN correlation, the beacon must address both effects.

Beacon Design

As indicated in the above discussion, accurate detection of the acoustic PN signal requires an advanced beacon design. There are several features of the beacons' DSP56002 processor that distinguish it from other general purpose processors and make it particularly suitable for the navigation system of the present invention. Three of the features are: (1) program execution time of 20 million instructions per second (MIPS) at 40 MHz, (2) single-cycle 24×24 bit parallel multiply-accumulator, and (3) highly parallel instruction set with unique DSP addressing modes.

Figure 8:
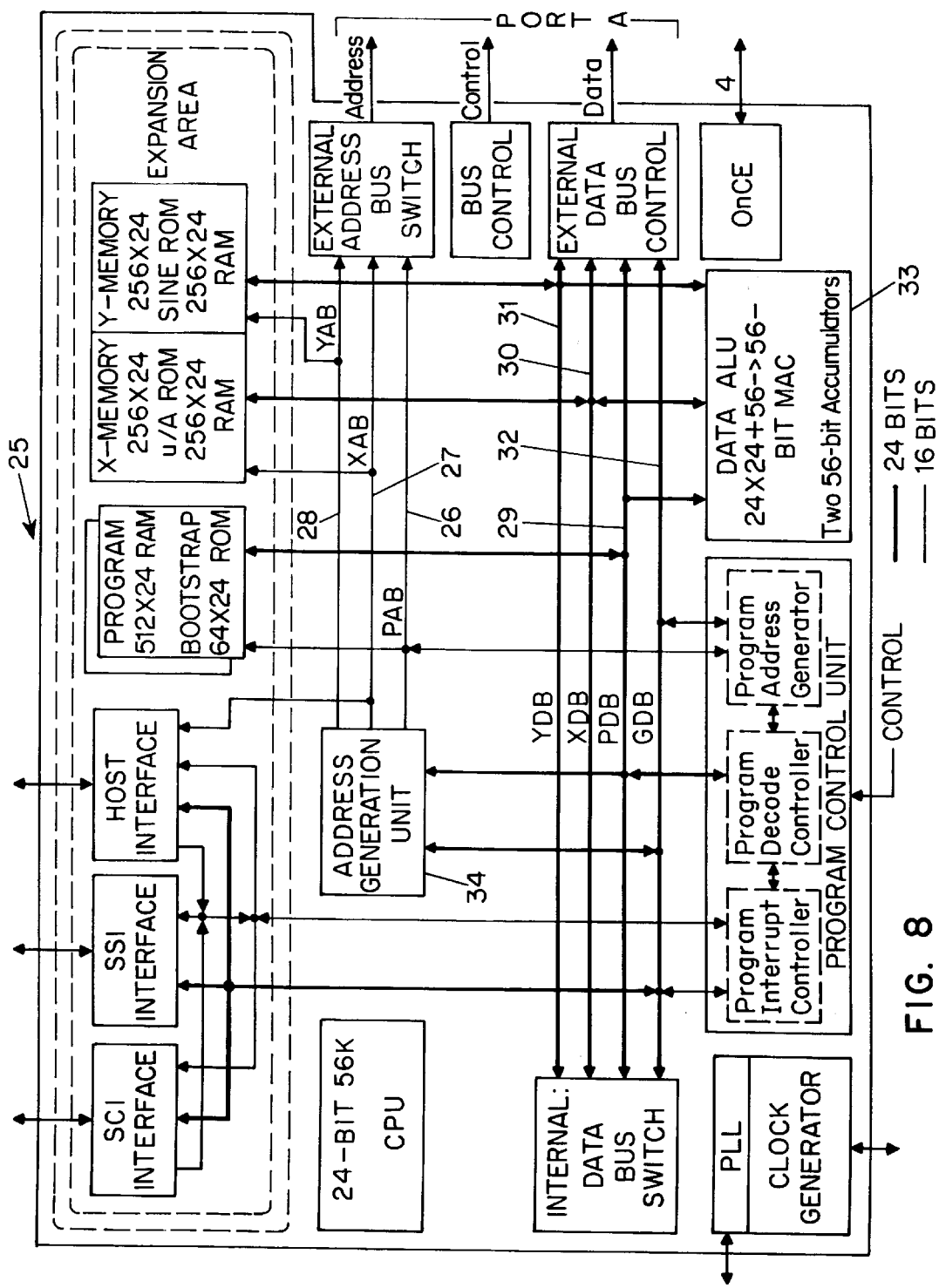
FIG. 8 is a block diagram of a digital signal processor used in one embodiment of the invention.

The parallel data moving capabilities of the DSP56002 are shown in the block diagram of FIG. 8. In addition to the program address bus (PAB) 26, the DSP56002 25 includes the x-memory (XAB) 27 and y-memory (YAB) 28 address buses, all of which are 16-bits wide. Associated with each of these address buses are the data buses for the program (PDB) 29, x-memory (XDB) 30 and y-memory (YDB) 31. The data moving capability is such that data can be moved simultaneously over each data bus in one execution cycle. There also is a Global Data Bus (GDB) 32 which handles all of the external data moving tasks. The parallelism of the data and address buses combine to supply a substantially fast program execution time, as stated above.

Figure 9:
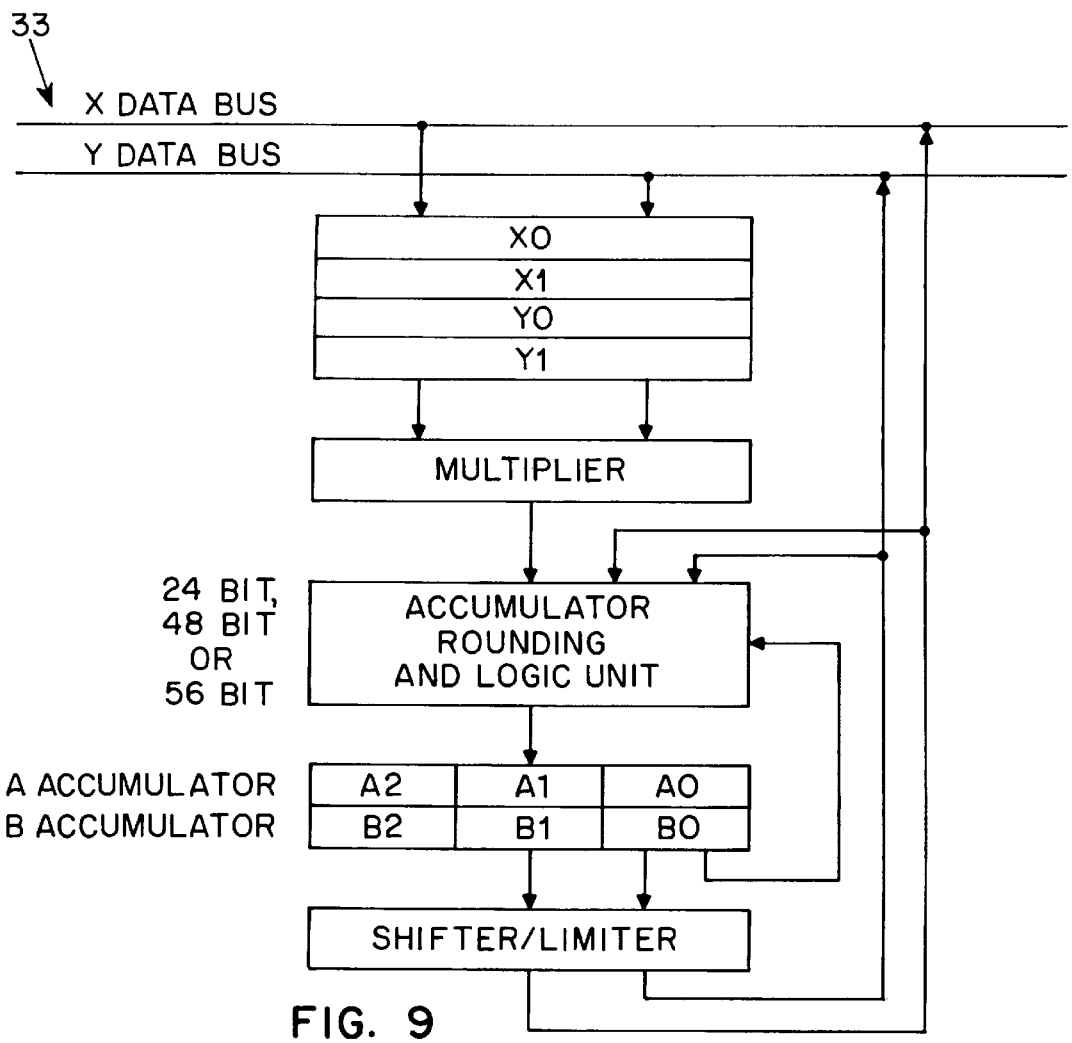
FIG. 9 is a data arithmetic logic unit of the digital signal processor of FIG. 8.

A notable architectural feature of the DSP56002 is the data arithmetic logic unit (ALU) 33 shown, with detail, in FIG. 9. The data ALU features the multiply and accumulate (MAC) unit. A major part of the PN ranging system is the cross-correlation process which consists of the operation $\Sigma_i\, \alpha_i\cdot\beta_i$. The MAC unit is optimized to perform the $\Sigma_i\, \alpha_i\cdot\beta_i$ operation on 24-bit operands, producing a 56-bit result. This calculation is performed in one instruction cycle. Parallel pipelining allows the sum over n terms to be performed in n+2 instructions. The first two instructions prefetch the $\alpha_o$ and $\beta_o$ values over the X and Y data buses. Then the remaining n instructions multiply $\alpha_i$ and $\beta_i$ while simultaneously fetching $\alpha_{i+1}$ and $\beta_{i+1}$ over the X and Y data buses, respectively, for the next MAC cycle. This strategy is used extensively in the correlation portion of the beacon code.

Figure 10:
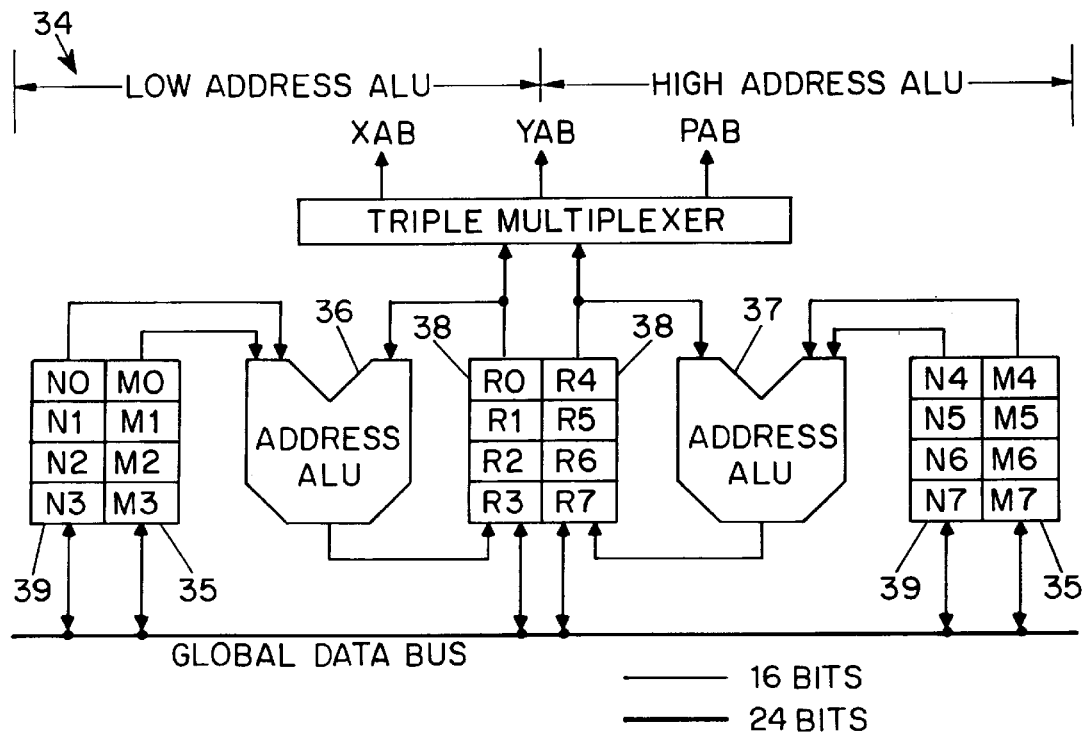
FIG. 10 is a block diagram of an address generation unit of the digital signal processor of FIG. 8.

The address generation unit (AGU) 34 of the DSP56002 shown in FIG. 8 uses integer arithmetic to perform the effective address calculations necessary to address data operands in memory, and contains the registers (Rn) used to generate the addresses. FIG. 10 shows the block diagram of the AGU 34. It implements linear, modulo, and reverse-carry arithmetic by means of the modifier registers (Mn) 35. The AGU is divided into two identical halves comprising the low address ALU 36 and the high address ALU 37, each of which have four sets of three registers. These registers are the address registers (R0–R3 and R4–R7) 38, the offset registers (N0–N3 and N4–N7) 39, and the modifier registers (M0–M3 and M4–M7) 35. The eight Rn, Nn and Mn registers are treated as register triplets. The modifier registers encompass the unique features of the addressing capabilities of this AGU. By setting Mn equal to negative one, linear addressing results, which is normally how the addressing works in general purpose processors. By setting Mn equal to some positive number (p−1), a circular buffer of length p (some power of two) results. When the bottom of the circular buffer is reached, the modulo addressing capability resets the buffer pointer to the beginning of the buffer. This is very useful when coding digital filtering applications. When Mn is set to zero, bit-reversed, reverse carry addressing is in progress. This is very useful in Fast Fourier Transform applications. For the PN Ranging application, the circular buffer capabilities of the AGU are used extensively.

Figure 11:
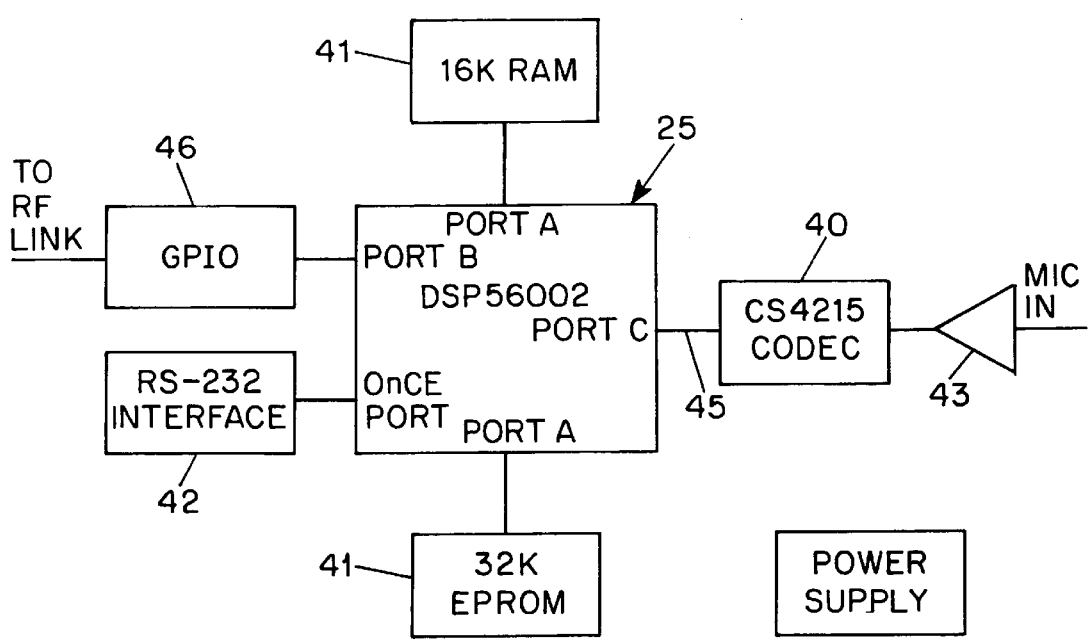
FIG. 11 is a block diagram of an evaluation module of the digital signal processor of FIG. 8.

FIG. 11 shows a block diagram of the DSP56002 Evaluation Module (EVM). The EVM is built around the combination of the Motorola DSP56002 25 and the Crystal Semiconductor CS4215 Codec 40. The module also contains support components for memory access 41, an RS-232 link 42, microphone input conditioning 43 and power supply 44. The DSP56002 is coupled to the Codec via a synchronous serial interface (SSI) 45, which can transfer data at sample rates of up to 50 kHz. The RS-232 interface 42 allows the programmer to use the on chip emulator (OnCE) features of the EVM module to test the program on the actual hardware using the Debug-EVM software supplied with the module. In addition to the SSI, there are also fifteen general purpose input/output (GPIO) pins 46 on the module that can be programmed at the developer's discretion.

Receiver Software

Figure 12:
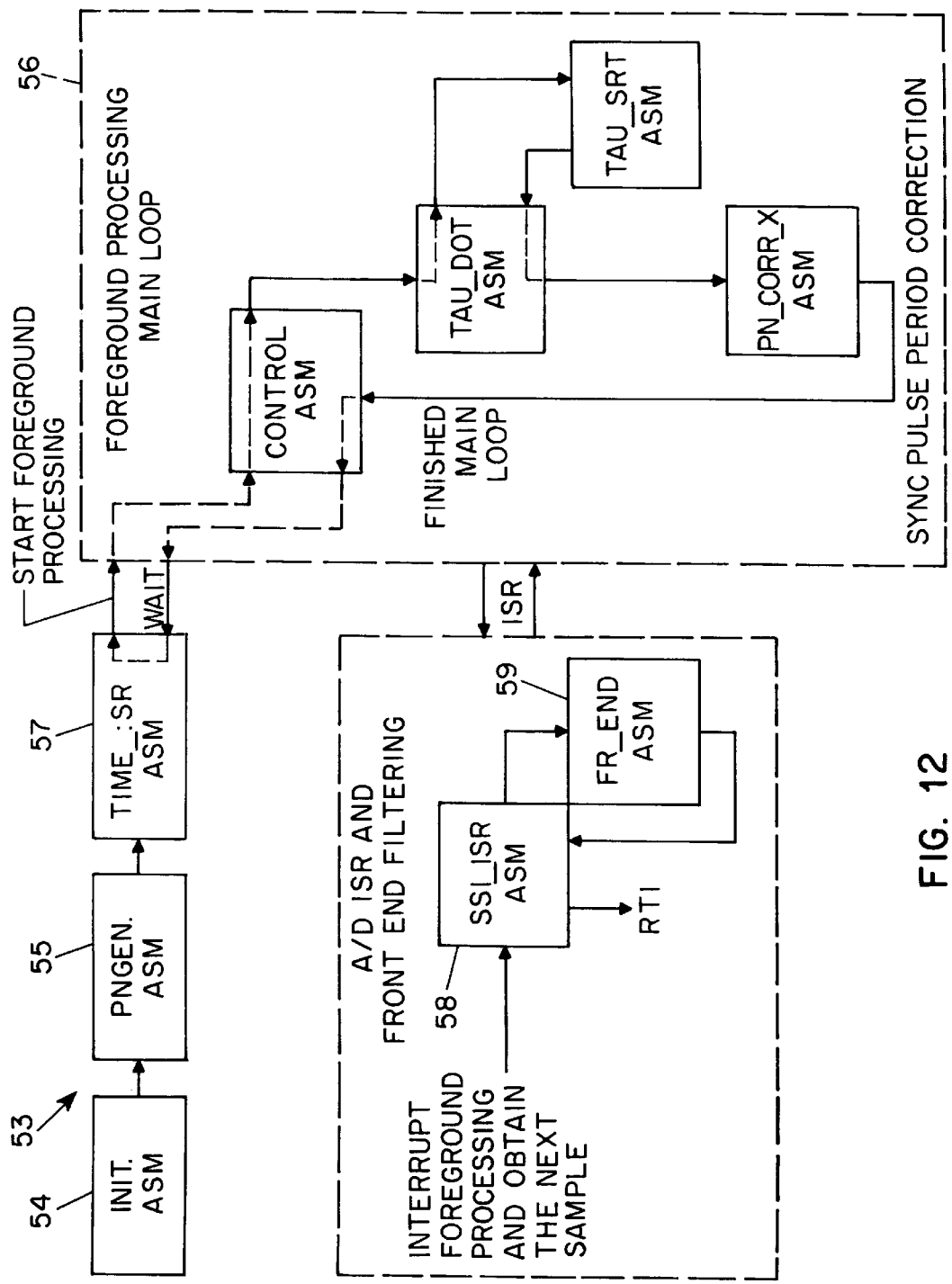
FIG. 12 is an illustration of the structure of the beacon according to an embodiment of the invention.

The beacon's PN "Receiver" software can be programmed in Motorola DSP56002 assembly language. The software code is attached as Appendix A. FIG. 12 illustrates the software 53 and the relationships between the different subroutine functions, which were developed simultaneously and then linked together in the main program (MAIN.ASM) using include statements. The main memory map (MEM_MAP.ASM) is where the starting addresses of all the various circular buffers and constants are defined for use in the other subroutines. This is so the locations of all the large buffers used in the processing stage are all in one place so they can be readily modified should any other features be added to the software design.

The first executed subroutine is the initialization code 54 (INIT.ASM) which configures the digital signal processor and the Codec 40 on the EVM module. This subroutine is executed first because it initializes all of the various features of the DSP56002 that will be used in the Receiver program.

The second subroutine to be executed is the PN code generator 55 (PNGEN.ASM), a software implementation of the linear feedback shift register sequence illustrated in FIG. 7. This subroutine fills up the internal X-memory with the PN code used to correlate the received signal. This subroutine generates what is referred to as the locally generated PN code, and will be compared to the received PN code to test for the maximum correlation.

The Receiver code main loop 56 (CONTROL.ASM) controls the flow of the foreground processing. It is responsible for calling the correlation routines and handing the sync pulse output period correction to a timer control subroutine (TIMER.ASM) (not illustrated). This timer subroutine handles the sync pulse output and controls the period of the main execution loop. The execution of the main loop 56 occurs approximately every 318 msec with a maximum wait time at the top of the loop of approximately 20 msec.

The correlation portion of the main loop 56 takes place in two distinct steps. First, the received signal is modified by the rotation and time compression/expansion routines (TAU_DOT.ASM & TAU_SRT.ASM) to correct for any compression or expansion on the received PN modulation due to the motion of the robotic platform. Then, the modified received signal is correlated with the locally generated PN code in internal X-memory created by a correlation subroutine (PN_CORR_X.ASM). The correlation routine locates the maximum correlation out of the cross-correlation process and returns a value used to adjust the sync pulse output. The system performs a two dimensional delay/Doppler carrier frequency search that involves compensating for both the time compression/expansion of the PN modulation and the Doppler carrier frequency shifts due to the motion of the platform.

The sync pulse output Interrupt Service Routine (ISR) 57 handles the output of the sync pulse, and sets pointers used in the main loop to their corrected values. The index in the In-phase and Quadrature (I/Q) data buffer, IQ_BUFF, corresponding to the maximal correlation is used by this ISR (TIME_ISR.ASM) 57 to determine the sync pulse period correction.

The ISR 58 (SSI_ISR.ASM) that samples the microphone input calls the front end processing subroutine 59 (FR_END.ASM) every time the SSI receive data interrupt occurs. The front end processing subroutine consists of a four pole Butterworth band pass filter centered on the carrier frequency and a decimation portion to reduce the amount of data to four samples per chip. The front end section then loads the filtered samples into the I/Q data buffer for the correlation routines to process.

The timer control subroutine is divided into the foreground processing subroutines and the Timer ISR (TISR). The foreground processing consists of the main control loop algorithms used to process the received signal and perform the correlation calculations. The main loop control program begins when a TISR flag is set.

The TSR functions in one of three interrupt states. The first state completes several tasks, the first of which is to transmit the reconstructed sync pulse over the RF link. The next task is to define values for the cyclic pointers that are used in the buffer that stores I/Q samples during foreground processing. The last task completed is to set the time until its next interrupt. In the first state, the timer is set for 2 ms which is the width of the sync pulse.

For the second interrupt state, a flag for the start of the foreground processing is set. The value given to the timer is 200 ms, which is the time to complete the foreground processing plus a small margin to ensure the processing is completed.

The third interrupt state has the sole task of setting the timer with the value returned by the foreground processing. This value represents the time delay that is being compensated for in the time scaling portion. This makes it possible to accurately mark the completion of the data collection for the next set of data, and thereby start the cycle over again. In all states, the front end ISR is cycling in order to acquire the needed data samples from the microphone input.

Figure 13:
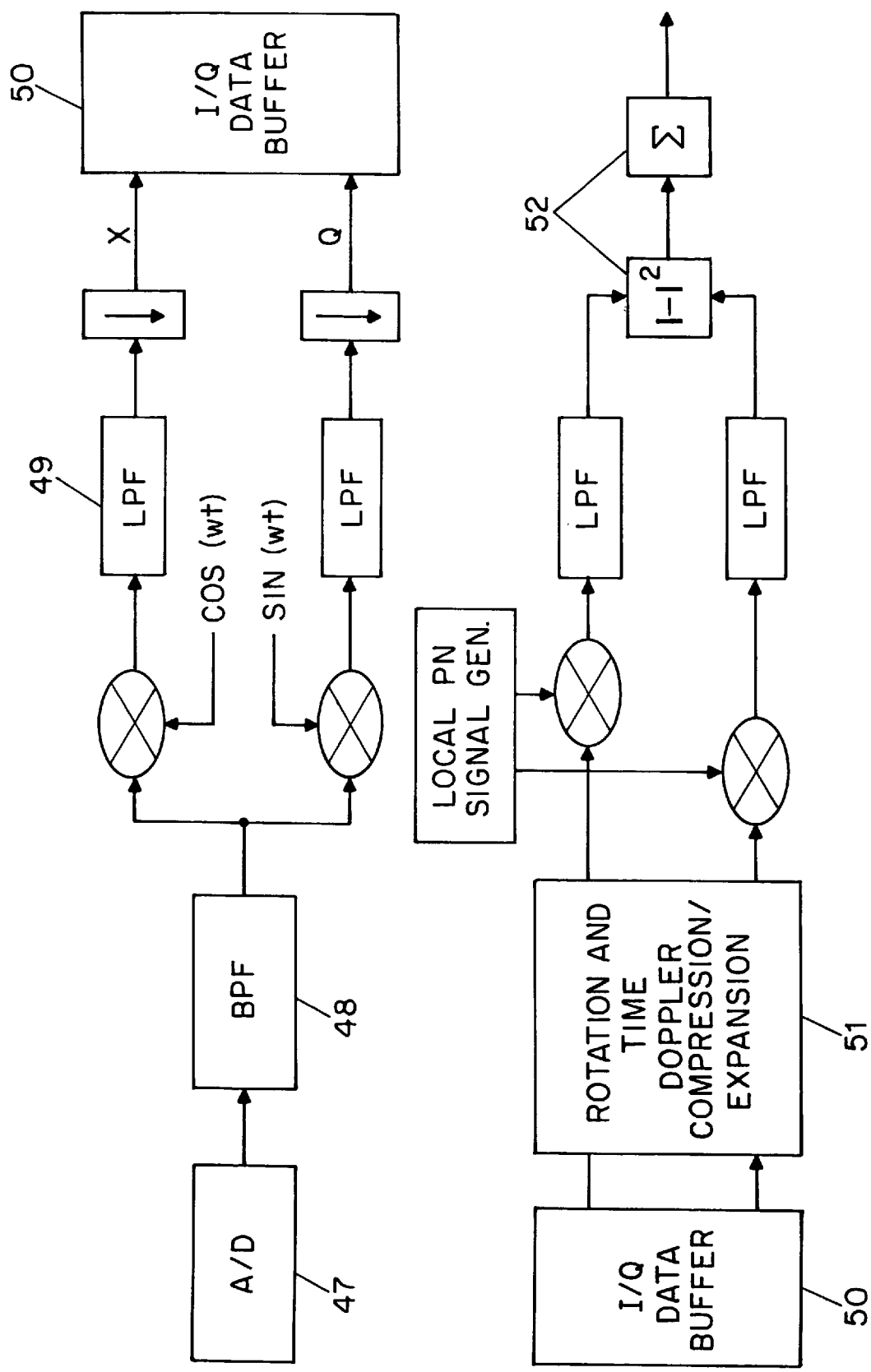
FIG. 13 is a block diagram of the receiver program according to one embodiment of the invention.

The main elements of the DSP software are schematically illustrated in FIG. 13. The front end section of the ranging system is required for signal acquisition. In this embodiment, this section has been implemented as an ISR and contains one band pass filter, two low pass filters and complex hybrid signal multiplication and decimation functions. After the acoustic signal is detected by a microphone (not shown), it is then sampled by an A/D converter 47, located in the Codec chip module, for digital processing. The sampled signal is first processed by a band pass filter (BPF) 48 to remove out-of-band interference. This is followed by a standard I/Q demodulator 49 in which the signal is multiplied by $\cos(2\pi f_c t)$ and $\sin(2\pi f_c t)$ and low pass filtered (LPF) to produce the lowpass I & Q signals. The high rate necessary for sampling the bandpass signal is not necessary for representation of the lowpass I & Q signals. Thus, decimation is performed at the output of the low pass filters. The PN signal, after being run through the BPF, is sampled with a sampling frequency equal to an integer multiple (m=1) of four times the carrier frequency ($f_c$) which is in turn n times faster than the chip rate of 800 Hz ($n=f_c/800$). Using every nth sample the following four state repeating sequence of In-phase and Quadrature components result: $(I,Q)_1, (I,-Q)_2, (-I,-Q)_3, (-I,Q)_4$. This data is accumulated in an I/Q data buffer 50. There is no need for carrier demodulation because the sampling rate of four times the carrier frequency effectively addresses this problem because sequential samples turn out to be ninety degrees out of phase from one another.

Once an entire period of the PN sequence has been sampled and preprocessed as described above, the beacon performs the PN cross-correlations. One block of data from the I/Q buffer is first processed to remove Doppler and time compression/expansion in block 51. This is done for several preselected values of delay rate $\dot{\tau}$. Hence, after the Doppler and time compression/expansion, there is still a residual frequency error. For this reason, the beacon employs an incoherent correlator 52.

For instance, the number of preset values of $\dot{\tau}$ may be determined by the requirement that the maximal post-correction residual time expansion/compression error be no more than a quarter chip ($T_c/4$). This requirement results in seven preset $\dot{\tau}$ values. In this instance, the data sample rate is decimated to four samples per PN chip. This results in 4×255=1020 I & Q data samples per PN signal period, and hence, 1020 possible settings for $\tau_0$. Seven preset values of $\dot{\tau}$ result in 7×1020=7140 correlation computations, each requiring ≈2×255 multiply/addition operations. All correlation may be performed on the DSP56002 processor within the 318 msec cycle time.

The index in the I/Q data buffer corresponding to the maximal correlation determines the sync pulse period correction. The sync pulse period and the code period should be identical, but the sync pulse output occurs ≈318 msec±error. The error occurs because the robotic platform may be making a change in direction, accelerating or decelerating causing a Doppler effect on the code. It is this Doppler effect on the code, either shortening or lengthening the code period, that necessitates the sync pulse period correction.

System Operation

In the navigation mode, the platform uses a two-tiered motion control strategy to take it through a predefined set of tasks within its working perimeter. The two levels are termed primary navigation system (open loop) and secondary navigation system (closed loop).

The primary navigation system operates in an "open loop" fashion called dead reckoning, i.e. there is no outside reference to correct position. The controller of the dead reckoning system receives motion commands (direction, velocity, acceleration, duration) and tool commands (on/off, tool parameters) from the on board computer. The commands are interpreted and converted step-by-step to signals for controlling the drive system and tool(s). The primary navigation system uses several feedback elements, such as speed sensors, pressure sensors, proximity sensors (to determine hazardous obstacles) and a magnetic compass. The end result of dead reckoning is that the platform moves to a new location while the tool(s) are off or performing the desired function.

In dead reckoning, two quantities are measured: the robotic platform's forward speed $s(t)$ and heading rate $\psi(t)=d\psi(t)/dt$. Given perfect knowledge of $s(t)$ and the heading angle $\psi(t)$, the platform's velocity is $$v(t) = \begin{bmatrix} v_x(t) \\ v_y(t) \end{bmatrix} = \begin{bmatrix} s(t)\cos(\psi(t)) \\ s(t)\sin(\psi(t)) \end{bmatrix}.$$

The quantities $s(t)$, $\psi(t)$, $p(t)$ and $v(t)$ denote the true values of speed, heading, position and velocity, respectively. The primary navigation system measurements are denoted $s^m(t)$ and $\psi^m(t)$. Of course, there are errors associated with these measurements and computations. The navigation system of the present invention never knows these "true values." Rather, the purpose of a navigation system is to process the measurements to compute estimates of $p(t)$, $\psi(t)$ and $v(t)$. Estimates are denoted with a hat; for example $\hat{p}(t;k)$ will denote the primary navigation position estimate. (The index k is explained below). Since the estimates are not the true values, they have error. Estimate errors are denoted with a prefix $\delta$. For example, $\delta p(t;k)=\hat{p}(t;k)-p(t)$ is the primary navigation system position error.

In reality, the primary system measurements may be discrete in nature, not the continuous time functions $s^m(t)$ and $\psi^m(t)$ indicated here. For example, these measurements may be derived by counting "clicks" from rotation sensors on the left and right wheels. In addition, the dead reckoning integration (presented below) is numerically evaluated as a discrete sum. Treatment, herein, of these quantities as continuous time functions is merely a mathematical convenience for the purpose of exposition of the fundamental principles at play. The data collection process of the primary navigation system is much faster than the secondary system. Thus, a fast primary data stream may be viewed as a continuous time stream relative to the secondary navigation system.

The goal of the primary navigation system is to estimate position and heading on demand. It is appropriate to group these quantities into a single 3-dimensional state vector $$x(t) \stackrel{\text{def}}{=} \begin{bmatrix} p(t) \\ \psi(t) \end{bmatrix}.$$

At times $t_1 < t_2 < \ldots$, the secondary navigation system processes its range measurements to produce estimates $\hat{x}_k^+$. This state vector estimate is the best available estimate of $x(t_k)$ given all of the primary and secondary navigation data collected up to time $t_k$. Computation of $\hat{x}_k^+$ is discussed in detail later; for now, the following analysis assumes that it is available at time $t_k$.

Let $\hat{x}(t;k)$ denote the primary system state vector estimate for time $t \geq t_k$. This estimate is initialized by the secondary navigation system:

$$\hat{x}(t_k; k) = \hat{x}_{k+1}^+ = \begin{bmatrix} \hat{p}_{k+1}^+ \\ \hat{\psi}_{k+1}^+ \end{bmatrix}. \tag{1}$$

The primary navigation system extrapolates this estimate forward in time utilizing the speed and heading rate measurements $s^m(t)$ and $\psi^m(t)$. This computation is $$\begin{aligned}
\hat{p}_x(t;k) &\quad \hat{p}_{x,k}^+ \quad \int_{t_k}^t s^m(u)\cos(\hat{\psi}(u;k))du \\
\hat{p}_y(t;k) &= \hat{p}_{y,k}^+ + \int_{t_k}^t s^m(u)\sin(\hat{\psi}(u;k))du \quad \text{for } t \geq t_k. \\
\hat{\psi}(t;k) &\quad \hat{\psi}_k^+ \quad \int_{t_k}^t \psi^m(u)du \\
= \hat{x}(t;k) &= \hat{x}_k^+
\end{aligned} \tag{2}$$

Equation (2) is the dead reckoning equation. Dead reckoning is an open loop integration. Errors associated with the measurements $s^m(t)$ and $\hat{\psi}(t)$ are accumulated by this integration, and as a result, the position and heading errors grow without bound. In other words, the unaided dead reckoning is unstable.

Figure 14:
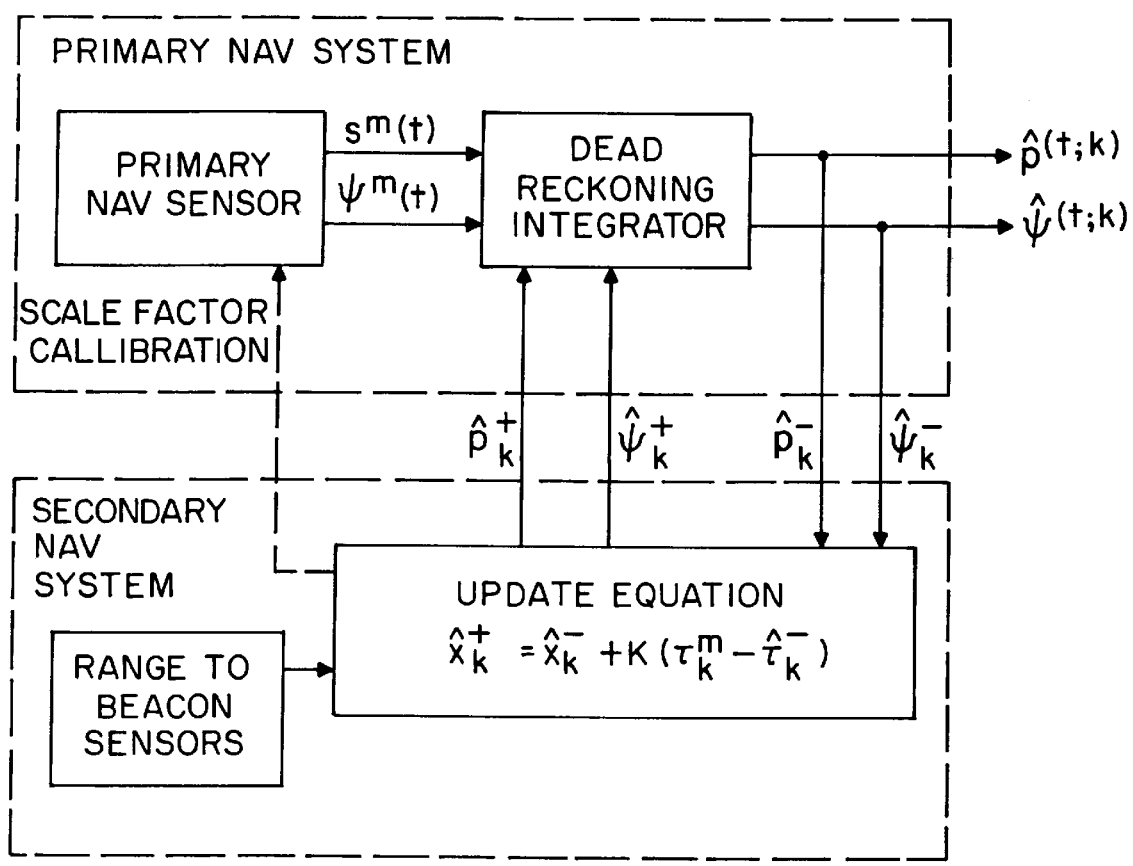
FIG. 14 illustrates the interactions between the primary and secondary navigation systems of the invention.

Thus, because non-uniform surface conditions or internal errors may cause the platform to take a somewhat different path from what the computer instructs it to take in the primary navigation system, the secondary navigation system provides an independent coordinate measurement and error correction as it constantly monitors the position of the platform using the acoustic PN ranging system described hereinabove. In other words, the secondary navigation system "closes the loop" that stabilizes the system. FIG. 14 illustrates this interaction between the primary and secondary navigation systems.

The secondary navigation system computes the estimate $\hat{x}_k^+$ that initializes the dead reckoning integration at time $t_k$ for dead reckoning in the time interval $[t_k, t_{k+1}]$. The secondary navigation system utilizes two types of data to compute $\hat{x}_k^+$: 1) an a priori estimate $\hat{x}_k^-$, and 2) the range-to-beacon measurements for time $t_k$. The a priori estimate $\hat{x}_k^-$ is provided by the primary navigation system:

$$\hat{x}_k^- = \hat{x}(t_k; k-1) \tag{3}$$

Figure 15:
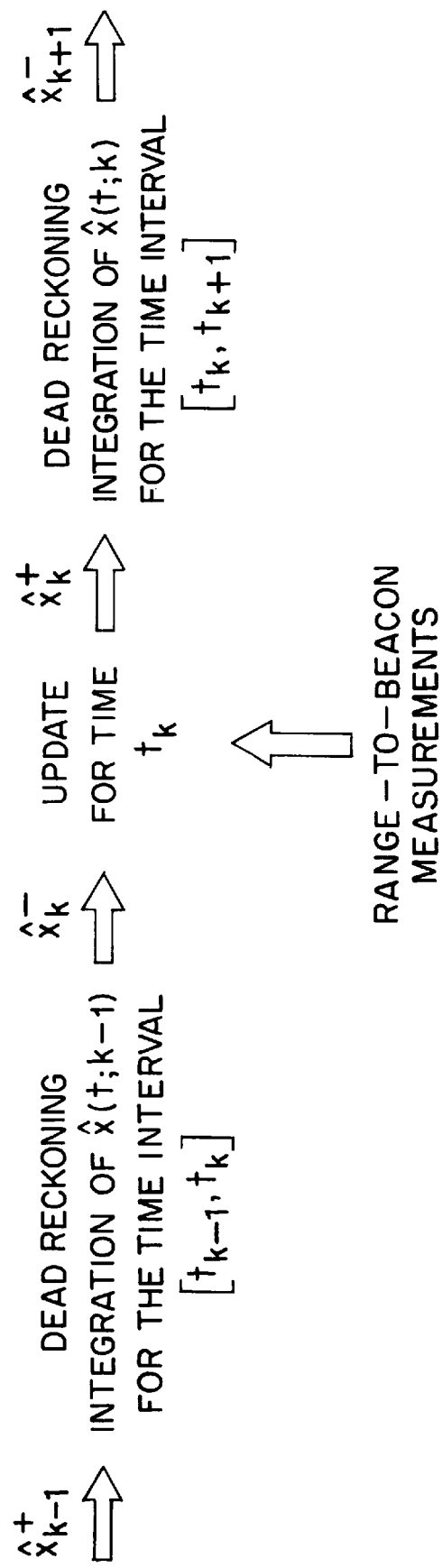
FIG. 15 is a timeline for the secondary navigation system of the invention.

$\hat{x}_k^- = \hat{x}(t_k; k-1)$ is just the result at time $t_k$ of the dead reckoning integrations that were initialized at $t_{k-1}$. Thus, the a priori estimate $\hat{x}_k^-$ is the best estimate of $x(t)$ given the range-to-beacon data up to time $t_{k-1}$, and the primary speed and heading up to time $t_k$. The basic secondary navigation computation incorporates the new range-to-beacon measurements for time $t_k$ to compute $\hat{x}_k^+$. Thus, the "a priori" terminology means "prior to utilization of the new range-to-beacon data." Accordingly, $\hat{x}_k^+$ is called the updated estimate, meaning "updated by the new range-to-beacon data." The time line for the secondary navigation system processing is illustrated in FIG. 15.

The range-to-beacon measurements are really measurements of the propagation delay of a signal transmitted from the platform to the beacon and then retransmitted back to the platform, as described above. Let $\tau_{i,k}^m$ denote this propagation delay measurement for the with beacon as measured for time $t_k$. As a vector, $\tau_k^m = [\tau_{1,k}^m \ldots \tau_{4,k}^m]^t$ is written for a four beacon system. Then the basic estimate update equation is $$\hat{x}_k^+ = \hat{x}_k^- + K_k(\tau_k^m - \hat{\tau}_k^-) \tag{4}$$

where $\hat{\tau}_k^-$ is the a priori estimate of the propagation delay measurement. $K_k$ is called the update gain matrix. Observe that the update equation adjusts the a priori estimate $\hat{x}_k^-$ to account for the difference between the actual measurement, $\tau_k^m$, and the a priori estimate of what the measurement will be, $\hat{\tau}_k^-$.

The optimal gain matrix is called the Kalman gain matrix. The basic estimate update structure of equation (4) would also be used in a suboptimal system. The only difference is that a suboptimal gain $K_k$, perhaps a fixed gain $K_k \equiv K$, would be used. Computation of the optimal Kalman gain and suboptimal gain design is deferred to a later section. How the a priori measurement estimates $\hat{\tau}_k^-$ are to be computed is shown to complete the presentation of the basic filter structure.

Let $p_i = [p_{i,x}, p_{i,y}]^t$ denote the position of the ith beacon. Then $$r_i(t) = \sqrt{[p_{i,x} - p_x(t)]^2 + [p_{i,y} - p_y(t)]^2} \tag{5}$$

is the true range to the ith beacon, and $$e_i(t) = \frac{p_i - p(t)}{r_i(t)} \tag{6}$$

is the line-of-sight unit vector that points from the platform towards the ith beacon. During the time that the signal propagates from the platform to the beacon and back to the platform, the platform moves. This motion must be accounted for in the measurement equation. Assume a signal (perhaps a simple pulse) that is transmitted from the platform at time instant $t_k$, propagates to the beacon where it is retransmitted and propagates back to the platform. Since the platform receives the retransmitted signal at time $t_k + \tau_{i,k}$, the propagation delay satisfies the equation $$\tau_{i,k} = \frac{1}{c}(r_i(t_k) + r_i(t_k + \tau_{i,k})). \tag{7}$$

where c is the speed of propagation.

Equation (7) is nonlinear in $\tau_{i,k}$. As a result, the following linearization proves useful in the analysis.

Start with $$r_i(t_k + \tau_{i,k}) = r_i(t_k) + \frac{\partial}{\partial t}r_i(t)\bigg|_{t=t_k}\tau_{i,k} + \text{linearization error}.$$

Differentiating (5), using $$\frac{d}{dt}p(t) = v(t),$$

yields $$\frac{\partial}{\partial t}r_i(t)\bigg|_{t=t_k} = \frac{1}{2}([p_{i,x} - p_x(t_k)]^2 + [p_{i,y} - p_y(t_k)]^2)^{-\frac{1}{2}} \times$$

$$(2[p_{i,x} - p_x(t_k)]v_x(t_k) - 2[p_{i,y} - p_y(t_k)]v_y(t_k))$$

$$= \underbrace{\frac{p_{i,x} - p_x(t_k)}{r_i(t_k)}}_{= e_{i,x}(t_k)} v_x(t_k) + \underbrace{\frac{p_{i,y} - p_y(t_k)}{r_i(t_k)}}_{= e_{i,y}(t_k)} v_y(t_k) = e_i(t_k) \cdot v(t_k)$$

where denotes the vector dot product. Thus, $$r_i(t_k + \tau_{i,k}) = r_i(t_k) + e_i(t_k) \cdot v(t_k)\tau_{i,k} + \text{linearization error}. \tag{8}$$

Applying this to (7) and solving for $\tau_{i,k}$ yields $$\tau_{i,k} = \frac{2r_i(t_k)}{c - e_i(t_k) \cdot v_i(t_k)} + \text{linearization error}. \tag{9}$$

The best a priori estimate $\hat{\tau}_{i,k}^-$ would be evaluated by replacing $r(t)$ and $\tau_i$ in (7) with $\hat{r}(t;k)$ (computed by applying $\hat{p}(t;k)$ and $\hat{\tau}_{i,k}^-$). The problem is that this is a nonlinear equation in $\hat{\tau}_{i,k}^-$ that cannot be solved. However, if the linearized version (9) is used, then an a priori estimate is easily evaluated as $$\hat{\tau}_{i,k}^- = \frac{2\hat{r}_{i,k}^-}{c - \hat{e}_{i,k}^- \cdot \hat{v}_{i,k}^-} \tag{10}$$

where $$\hat{r}_{i,k}^- = \sqrt{(p_{i,x} - \hat{p}_{x,k}^-)^2 + (p_{i,y} - \hat{p}_{y,k}^-)^2},$$

$$\hat{e}_{i,k}^- = \hat{p}_k^- / \hat{r}_{i,k}^-, \text{ and}$$

$$\hat{v}_k^- = s^m(t_k)\begin{bmatrix}\cos(\hat{\psi}_k^-) \\ \sin(\hat{\psi}_k^-)\end{bmatrix}.$$

Once again, taking into consideration the dead reckoning equation (2) which is rewritten verbatim below:

$$\hat{p}_x(t;k) \quad \hat{p}_{x,k}^+ \quad \int_{t_k}^t s^m(u)\cos(\hat{\psi}(u;k))du$$

$$\hat{p}_y(t;k) = \hat{p}_{y,k}^+ + \int_{t_k}^t s^m(u)\sin(\hat{\psi}(u;k))du \quad \text{for } t \geq t_k.$$

$$\hat{\psi}(t;k) \quad \hat{\psi}_k^+ \quad \int_{t_k}^t \psi^m(u)du$$

$$= \hat{x}(t;k) \quad = \hat{x}_k^+$$

the updated estimate $\hat{x}_k^+$ cannot be computed before the propagation delay time measurement $\tau_{i,k}^m$ is available, and this does not happen until time $t_k + \tau_{i,k}$. This suggests that two dead reckoning integrations will be performed for the time interval $[t_k, t_k + \max_i \tau_{i,k}]$: the old integration $\hat{x}(t;k-1)$ must be processed past time $t_k$ to time $t_k + \max_i \tau_{i,k}$. At that time, the updated estimate $\hat{x}_k^+$ may be computed. Only then can the dead reckoning integrator be initialized with $\hat{x}_k^+$ and, hence, dead reckoning integration for the time interval $[t_k, t_k + \max_i \tau_{i,k}]$ is performed a second time to compute $\hat{x}(t;k)$. Moreover, there is a problem that the primary speed and heading rate data for the time interval $[t_k, t_k + \max_i \tau_i]$ must be stored in order to perform the second dead reckoning integration. Fortunately, however, none of this is necessary.

The solution is in the way that the dead reckoning is performed. Define $$\hat{x}^0(t;k) \stackrel{def}{=} \begin{array}{l} \hat{p}_x^0(t;k) \\ \hat{p}_y^0(t;k) = \\ \hat{\psi}^0(t;k) \end{array} \begin{array}{l} \int_{t_k}^{t} s^m(u;k)\cos(\hat{\psi}^0(u;k))du \\ \int_{t_k}^{t} s^m(u;k)\sin(\hat{\psi}^0(u;k))du \\ \int_{t_k}^{t} \psi^m(u;k)du \end{array} \quad \text{for } t_k \leq t \leq t_{k+1}. \quad (11)$$

Observe that $\hat{x}^0(t;k)$ depends only on the measured speed and heading rate $s^m(u;k)$ and $\psi^m(u;k)$ for $t_k \leq u \leq t \leq t_{k+1}$, and not on any preset estimate (in particular, $\hat{x}_k^+$). $\hat{x}^0(t;k)$ is just the dead reckoning equation preset with a zero position and heading estimate: $\hat{x}^0(t_k;k)=0$.

The following relates $\hat{x}^0(t;k)$ to $\hat{x}(t;k)$. From the heading component of the dead reckoning equation (2) it is immediately evident that $$\hat{\psi}(t;k) = \hat{\psi}_k^+ + \hat{\psi}^0(t;k).$$

Using this last expression, the position components of the dead reckoning equation (2) can be rewritten as $$\begin{array}{l} \hat{p}_x(t;k) \\ \hat{p}_y(t;k) \end{array} = \begin{array}{l} \hat{p}_{x,k}^+ \\ \hat{p}_{y,k}^+ \end{array} + \begin{array}{l} \int_{t_k}^{t} s^m(u;k)\cos(\hat{\psi}_k^+ + \hat{\psi}^0(u;k))du \\ \int_{t_k}^{t} s^m(u;k)\sin(\hat{\psi}_k^+ + \hat{\psi}^0(u;k))du \end{array}.$$

Applying trigonometry, the following results:

$$\cos(\hat{\psi}_k^+ + \hat{\psi}^0(u;k)) = \cos(\hat{\psi}_k^+)\cos(\hat{\psi}^0(u;k)) - \sin(\hat{\psi}_k^+)\sin(\hat{\psi}^0(u;k))$$

and $$\sin(\hat{\psi}_k^+ + \hat{\psi}^0(u;k)) = \sin(\hat{\psi}_k^+)\cos(\hat{\psi}^0(u;k)) + \cos(\hat{\psi}_k^+)\sin(\hat{\psi}^0(u;k))$$

Applying these expansions to the posizion yields $$\begin{array}{l} \hat{p}_x(t;k) \\ \hat{p}_y(t;k) \end{array} = \begin{array}{l} \hat{p}_{x,k}^+ \\ \hat{p}_{y,k}^+ \end{array} + \begin{array}{cc} \cos(\hat{\psi}_k^+) & -\sin(\hat{\psi}_k^+) \\ \sin(\hat{\psi}_k^+) & \cos(\hat{\psi}_k^+) \end{array} \begin{array}{l} \int_{t_k}^{t} s^m(u;k)\cos(\hat{\psi}^0(u;k))du \\ \int_{t_k}^{t} s^m(u;k)\sin(\hat{\psi}^0(u;k))du \end{array}.$$

$$=\hat{p}(t;k) \quad =\hat{p}_k^+ \quad\quad\quad =\hat{p}^0(t;k)$$

Combining the position and heading results, it is apparent that the dead reckoning can be performed by actually integrating only (11), which is the dead reckoning equation initialized with zero position and heading, for each time interval $[t_k,t_k]$. Once the updated estimate $\hat{x}_k^+$ has been computed, at time $t_k+\max_i\tau_{i,k}$ (+processing time), the following may be evaluated:

$$\begin{array}{l} \hat{p}_x(t;k) \\ \hat{p}_y(t;k) \\ \hat{\psi}(t;k) \end{array} = \begin{array}{l} \hat{p}_{x,k}^+ \\ \hat{p}_{y,k}^+ \\ \hat{\psi}_k^+ \end{array} + \begin{array}{ccc} \cos(\hat{\psi}_k^+) & -\sin(\hat{\psi}_k^+) & 0 \\ \sin(\hat{\psi}_k^+) & \cos(\hat{\psi}_k^+) & 0 \\ 0 & 0 & 1 \end{array} \begin{array}{l} \hat{p}_x^0(t;k) \\ \hat{p}_y^0(t;k) \\ \hat{\psi}^0(t;k) \end{array} \quad (12)$$

$$=\hat{x}(t;k) \quad =\hat{x}_k^+ \quad \stackrel{def}{=} R(\hat{\psi}_k^+) \quad =\hat{x}^0(t;k)$$

The matrix $R(\hat{\psi}_k^+)$ is called the rotation matrix.

It may also be desirable to continue computing $\hat{x}(t;k-1)$ past time $t_k$ in order to have position and heading estimates available in the time interval $[t_k, t_k+\max_i\tau_{i,k}]$ before the kth update processing has been completed. Following exactly the same arguments as above, it can be shown that $$\hat{x}(t;k-1)=\hat{x}_k^- + R(\hat{\psi}_k^-)\hat{x}^o(t;k) \text{ for } t \geq t_k.$$

Notice that this last expression utilized $\hat{x}^0(t;k)$, not $\hat{x}^o(t;k-1)$. Thus, $\hat{x}^o(t;k-1)$ does not need to be integrated past time $t_k$, and there is no need to store the primary measurement data $s^m(t)$ and $\hat{\psi}^m(t)$ and re-integrate the dead reckoning equation over the time interval $[t_k, t_k+\max_i\tau_{i,k}]$.

In summary, the processing of data for a single cycle $[t_k,t_k]$ proceeds as follows:

At time $t_k$
  Evaluate the a priori estimates $\hat{x}_k^- = \hat{x}(t_k;k-1)$, $\tau_k^-$, etc.
  Initialize the dead reckoning integrator to 0 and begin computing $\hat{x}^o(t;k)$.
  Continue computing $\hat{x}(t;k-1) = \hat{x}_k^- + R(\hat{\psi}_k^-)\hat{x}^o(t;k)$.
At time $t_k+\max_i\tau_{i,k}$, when the measurement vector $\tau_k^m$ is available,
  Evaluate the updated estimates $\hat{x}_k^+ = \hat{x}_k^- + K(\tau_k^m - \hat{\tau}_k^-)$.
  Begin computing $\hat{x}(t;k) = \hat{x}_k^+ + R(\hat{\psi}_k^+)\hat{x}^o(t;k)$.

Thus, the range to beacon measurements derived from the acoustic navigation system of the present invention, when incorporated into the algorithms above, provide for the constant correction of the platform's position and direction as it autonomously travels within the work area.

Other modifications of the invention will occur to those skilled in the art.

We claim:

1. A navigation system comprising:
   a movable device within a given area, said movable device including:
      an acoustic transmitter for transmitting a continuous acoustic signal over said area;
      an RF receiver for receiving RF signals of a plurality of different frequencies; and
      an electronic processor means; and;
   three or more beacons positioned proximate to said given area within range of said acoustic signal, each of said beacons including:
      a signal receiving apparatus responsive to said acoustic signal to generate an RF signal corresponding to a unique one of said plurality of different frequencies; and
      an RF transmitter for transmitting said RF signal to said RF receiver on said movable device;
   said acoustic signal and said RF signal received from each of said beacons being processed in said electronic processor means to identify the location of said device within said area.

2. The navigation system of claim 1 wherein said acoustic signal is within the audible range.

3. The navigation system of claim 1 wherein said movable device further includes a self-contained means for controlling its position in response to said received RF signal from each of said beacons.

4. The navigation system of claim 1 wherein said movable device further includes one or more work elements for performing a function within said area.

5. The navigation system of claim 1 wherein said movable device further includes a programmable means for controlling movement of the device along a predetermined path, said electronic processor means responsive to said RF signal received from each of said beacons to alter said movement from said predetermined path.

6. The navigation system of claim 1 wherein said acoustic signal is a pseudo-noise signal derived from a binary sequence.

7. A position identifying system comprising:
   an apparatus positioned within a given area, said apparatus including:
      an acoustic transmitter for transmitting a continuous acoustic signal over said area;
      an RF receiver for receiving RF signals of a plurality of different frequencies; and
      an electronic processor means; and;
   three or more beacons positioned proximate to said given area within range of said acoustic signal, each of said beacons comprising:
      a signal receiving apparatus responsive to said acoustic signals to generate an RF signal corresponding to a unique one of said plurality of different frequencies; and
      an RF transmitter for transmitting said RF signal to said RF receiver on said movable device;
   said acoustic signal and said RF signal received from each of said beacons being processed in said electronic processor means to identify the location of said device within said area.

8. The position identifying system of claim 7 wherein said acoustic signal is within the audible range.

9. The position identifying system of claim 7 wherein said apparatus further includes one or more work elements for performing a function within said area.

10. The position identifying system of claim 7 wherein said acoustic signal is a pseudo-noise signal derived from a binary sequence.

11. The position indenting system of claim 7 wherein said movable device further includes self-contained means for controlling its position in response to RF signals received from said beacons.

12. A method of identifying a position within an area comprising the steps of:
   transmitting a continuous acoustic signal from an apparatus located at said position;
   receiving said acoustic signal by at least three beacons outside said area;
   transmitting, from each of said beacons, an RF signal responsive to said acoustic signal back to said apparatus, said RF signal having a unique frequency with respect to other RF signals generated by said beacons; and
   processing said acoustic signal and said RF signal received from each of said beacons to obtain the position of said apparatus.

13. The method of claim 12 further comprising the steps of:
   operating said apparatus in a survey mode to determine the location of said beacons; and
   operating said apparatus in a navigation mode to perform a sequence of tasks specified by a user.

14. A method of navigating a movable device within an area comprising the steps of:
   transmitting a continuous acoustic signal from said movable device located with said area;
   receiving said acoustic signal by at least three beacons proximate said area;
   transmitting, from each of said beacons, an RF signal responsive to said acoustic signal back to said movable device, said RF signal having a unique frequency with respect to other RF signals generated by said beacons; and
   processing said acoustic signal and said RF signal received from each of said beacons to identify the location of said movable device.

15. The method of claim 14 further comprising the step of controlling the position of said movable device in response to said received RF signal from each of said beacons.

16. The method of claim 14 further comprising the steps of:
   operating said movable device in a survey mode to determine the location of said beacons; and
   operating said movable device in a navigation mode to perform a sequence of tasks specified by a user.

17. A robotic platform for navigating and performing a function within an area outside of which are at least three beacons, said platform comprising:
   at least one work element for performing said function;
   a transmitter for transmitting a continuous acoustic signal;
   a receiver for receiving RF signals transmitted by each of said beacons at respectively different frequencies in response to said acoustic signal;
   a processor for processing said signals and outputting data; and
   a controller for controlling the direction of said platform and the application of said work elements.

18. The robotic platform of claim 17 wherein said acoustic signal is a pseudo-noise signal derived from a binary sequence.

19. The robotic platform of claim 17 further comprising:
   means for operating said robotic platform in a survey mode to determine the location of said beacons; and
   means for operating said robotic platform in a navigation mode to perform a sequence of tasks specified by a user.

* * * * *

UNITED STATES PATENT AND TRADEMARK OFFICE
CERTIFICATE OF CORRECTION

PATENT NO. : 5,940,346

DATED : August 17, 1999

INVENTOR(S) : Sadowsky et al.

It is certified that error appears in the above-identified patent and that said Letters Patent is hereby corrected as shown below:

Column 7, line 16, "$1/T_c$" should be -- $\propto 1/T_c$ --;

Column 7, line 24, "$y(t) \, x(t - \tau(t))$" should be -- $y(t) \propto x(t - \tau(t))$ --;

Column 14, line 11, "where denotes" should be -- where "·" denotes --.

Signed and Sealed this

Twenty-first Day of November, 2000

*Attest:*

Q. TODD DICKINSON

*Attesting Officer*      *Director of Patents and Trademarks*